(12) United States Patent
Beadle

(10) Patent No.: US 6,902,200 B1
(45) Date of Patent: Jun. 7, 2005

(54) CONTAMINANT-RESISTANT PIVOT JOINT FOR OUTDOOR LIGHTING FIXTURE

(76) Inventor: Joshua Beadle, 5362 Caminito Vista Lujo, San Diego, CA (US) 92130

(*) Notice: Subject to any disclaimer, the term of this patent is extended or adjusted under 35 U.S.C. 154(b) by 0 days.

(21) Appl. No.: 10/206,698

(22) Filed: Jul. 26, 2002

Related U.S. Application Data

(63) Continuation of application No. 09/536,676, filed on Mar. 28, 2000, now abandoned.

(51) Int. Cl.[7] .................... F16L 27/00; F21V 19/02
(52) U.S. Cl. .................. 285/185; 362/427; 362/371
(58) Field of Search ....................... 285/184, 185, 285/272, 69, 65; 362/418, 419, 427, 287, 362/269, 371, 267; 403/116, 113, 164; D26/61, D26/63, 72

(56) References Cited

U.S. PATENT DOCUMENTS

| | | | |
|---|---|---|---|
| 3,778,610 A | * | 12/1973 | Wolf ............... 362/418 |
| 3,879,066 A | * | 4/1975 | Kozinski .......... 285/69 |
| 5,937,510 A | * | 8/1999 | Seiersen et al. ... 29/753 |
| 6,059,429 A | * | 5/2000 | Bodell ............. 362/287 |
| 6,161,948 A | * | 12/2000 | Hagen ............. 362/418 |

* cited by examiner

Primary Examiner—Douglas C. Butler
(74) Attorney, Agent, or Firm—Procopio, Cory, Hargreaves & Savitch

(57) ABSTRACT

The pivoting knuckle joint for an outdoor lighting fixture comprises a base knuckle, a top knuckle and a fastener for locking the base and top knuckles in position. Each of the base knuckle and top knuckle has a generally cylindrical body with a domed top, a portion of which is cut-away to form a flattened face, and circular cavity formed in the flattened face with a tapered ferrule formed in and extending from the cavity. The ferrule of one of the knuckles has a smaller diameter than the other, so that the smaller ferrule fits within the larger ferrule, forming a pivot point. The relative diameters are adapted to closely fit such that friction is generated between the interfitting ferrules to form a taper lock, resisting rotation of one knuckle relative to the other. In the preferred embodiment, the smaller ferrule has an internal thread formed therein for receiving a locking screw inserted through the body of the knuckle with the larger ferrule, permitting the position of the joint to be locked in place after adjustment. Bores are formed through the base and top knuckles to provide a conduit for an electrical wire to pass through the assembly.

22 Claims, 2 Drawing Sheets

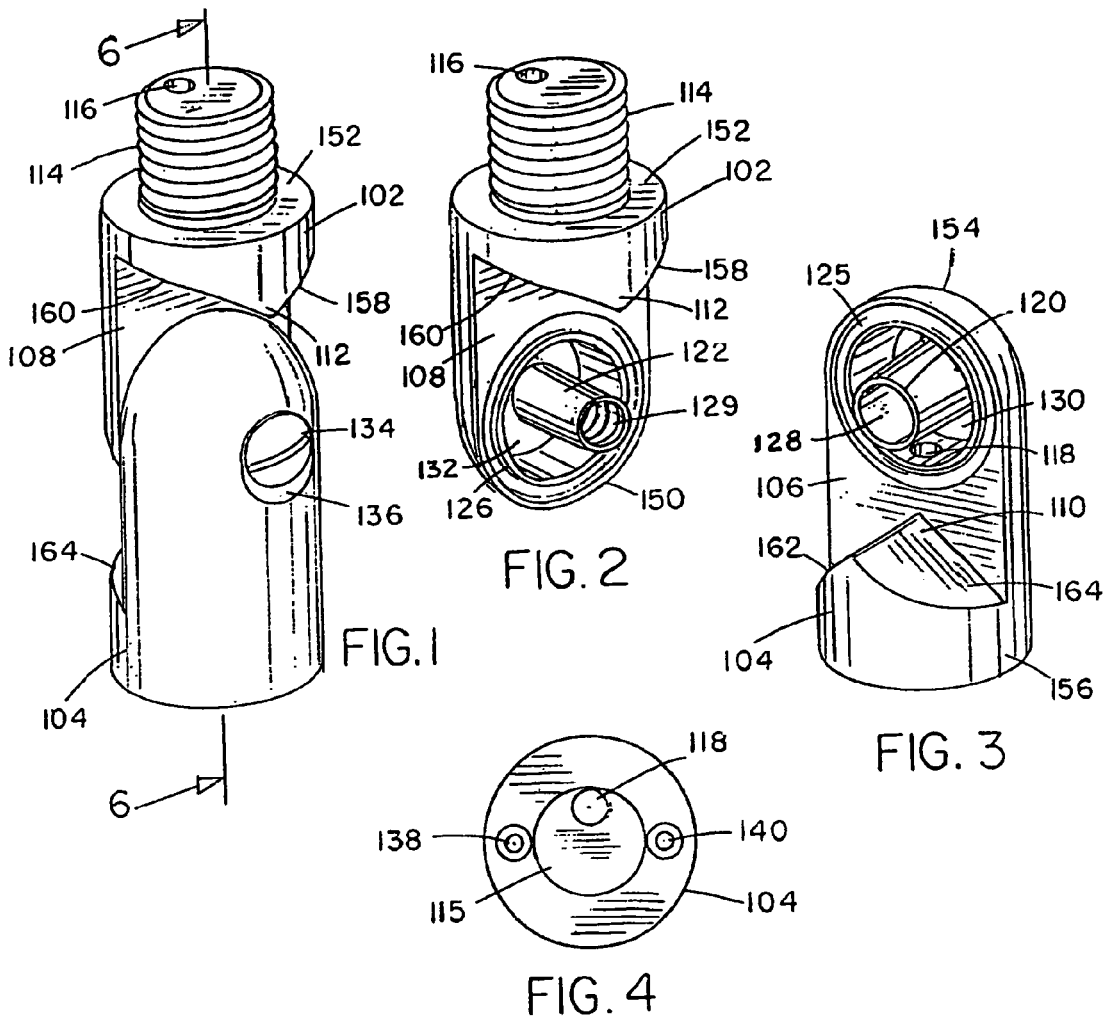
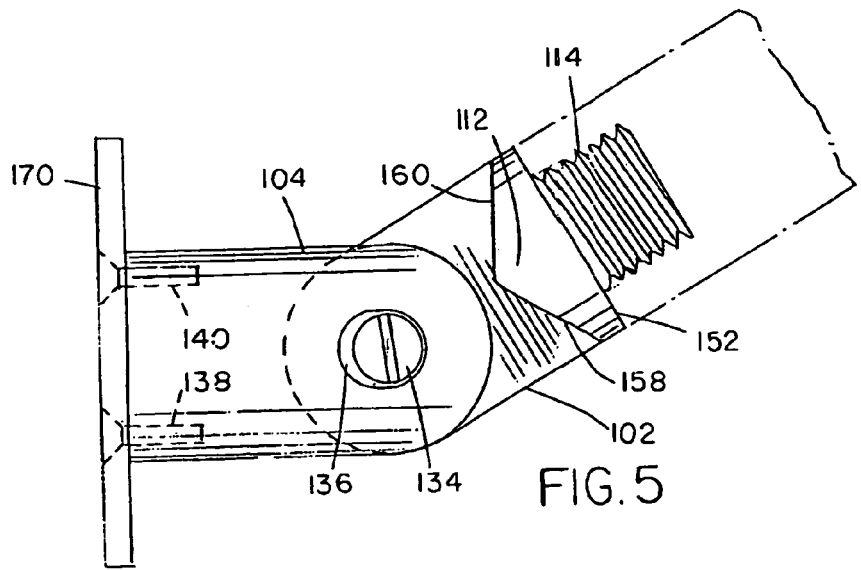

CONTAMINANT-RESISTANT PIVOT JOINT FOR OUTDOOR LIGHTING FIXTURE

RELATED APPLICATIONS

This is a continuation of application Ser. No. 09/536,676, filed Mar. 28, 2000, now abandoned.

FIELD OF THE INVENTION

Environmental lighting, particularly outdoor lighting, is well known in commercial or public settings, such as parks and schools. Such lighting has also become increasingly popular for use in private residences, both to enhance the appearance and safety of the outdoor area and for security by eliminating hiding place and unobserved entry points for intruders.

Landscape and outdoor lighting systems generally include one or more lighting fixtures which are connected to either a 12 V transformer or a standard 120 VAC line. The lighting fixtures generally include a housing, a reflector assembly having a halogen or conventional bulb, and a lens or window. Many configurations are known, each of which provides a different lighting effect.

One of the more popular and versatile lighting fixtures utilizes a cylindrical housing attached to a pivoting knuckle joint that allows the light to be directed at variable angles. The knuckle joint may be attached to a mounting bracket for attachment to structures, or placement of the fixtures can be as simple as sticking a tapered spike into the ground, so that no structures need to be modified to retain the fixture. Further, the use of a spike allows the fixtures to be placed within planters and lawn areas, and next to trees, away from structures.

Directability of the lighting fixture is important and much of this directability relies upon the pivoting knuckle joints. While the pivoting joints provide significant adaptability in the aiming of the light, they constitute the weakest point in the fixture. The fixtures are subject to impact from gardening tools and equipment as well as persons inadvertently running into or kicking the fixture. Exposure to various environmental conditions including temperature extremes, moisture and corrosive fertilizers and insecticides can weaken the joints and cause them to be easily broken. An example of a typical outdoor lighting fixture is provided in U.S. Pat. No. 4,464,707 of Forrest, where the joint comprises two pieces which remain pivotally engaged using opposingly toothed notches. A significant disadvantage of this particular configuration is that when the fixture is exposed to the elements, the toothed notches become fouled by dirt and corrosion and the two parts of the joint can no longer remain engaged. Furthermore, the adjustment is incremental, limited by the sizes and number of notches.

Other outdoor lighting fixture configurations, such as those disclosed in U.S. Pat. Nos. 4,626,975 and 5,713,662 provide examples of the pivot joint structures which may be more susceptible to wear and corrosion from prolonged exposure to the outdoor environment, or may not be sufficiently strong to withstand the punishment to which a ground-mounted lighting fixture can be subjected. In the lighting fixture disclosed in U.S. Pat. No. 4,626,975, the pivot joint is a relatively small structure attached to a much larger lamp housing, with a significant amount of surface area between the two hinged portions, thus providing locations where contaminants can collect to accelerate corrosion and cause the structure to seize up, preventing movement. In U.S. Pat. No. 5,713,662, the pivoting joint of the outdoor lighting fixture has at least four locations in the hinge where spaces between opposing surfaces can collect contaminants to eventually jam the joint to prevent movement.

It would be desirable to provide a sturdy joint for environmental lighting fixtures that allows the light angle to be adjusted over a wide range while minimizing the presence of components that can result in premature failure of the fixture due to weather, wear, dirt and corrosion.

SUMMARY OF THE INVENTION

It is an advantage of the present invention to provide a pivot joint for use in an outdoor lighting system that minimizes the space within which contaminants can collect.

It is another advantage of the present invention to provide a pivot joint for outdoor lighting systems with a wide range of adjustability. Another advantage of the present invention is to provide a pivot joint for outdoor lighting systems that can be adjusted and locked into position using a single fastener.

In an exemplary embodiment, the pivoting knuckle joint comprises a base knuckle, a top knuckle and a fastener for locking the base and top knuckles in position. Each of the base knuckle and top knuckle has a generally cylindrical body with a domed top, a portion of which is cut-away to form a flattened face, and circular cavity formed in the flattened face with a tapered ferrule formed in and extending from the cavity. The ferrule of one of the knuckles has a smaller diameter than the other, so that the smaller ferrule fits within the larger ferrule, forming a pivot point. The relative diameters of the ferrules are adapted to closely fit such that friction is generated when one knuckle is pivoted relative to the other, thus creating a taper lock which can hold the joint in position when one ferrule is fully seated in the other. In the preferred embodiment, the smaller ferrule has an internal thread formed therein for receiving a locking screw inserted through the body of the knuckle with the larger ferrule to hold the two knuckles together and, thus, permitting the position of the joint to be locked in place after adjustment. O-ring seats are formed around the perimeter of each cavity for receiving an O-ring to seal the interior of the joint against moisture and other contaminants and to provide additional frictional resistance to rotation of the joint. A bore is formed extending through the body of each knuckle exiting within the cavity on one end and through the distal end of the knuckle joint on the other end to provide a by-way for an electrically-conductive wire to be fed through the joint to provide voltage to the lamp. The distal end of the base joint has external threads formed thereon for attachment to a mounting device such as a spike or pole. The distal end of the top joint is adapted to connect to a housing containing a lamp and appropriate lenses and reflectors, and may include a recess and a plurality of threaded bores for receiving fastening screws.

BRIEF DESCRIPTIONS OF THE DRAWINGS

For a more complete understanding of the present invention, reference is now made to the following detailed description of the embodiments illustrated in the accompanying drawings, wherein:

FIG. 1 is a perspective view of the complete knuckle joint;

FIG. 2 is a perspective view of the top portion of the joint;

FIG. 3 is a perspective view of the base portion of the joint;

FIG. 4 is a bottom end view of the base portion;

FIG. 5 is a side view of the joint as mounted to a support means;

DESCRIPTION OF PREFERRED EMBODIMENTS

Figures 6, 7:
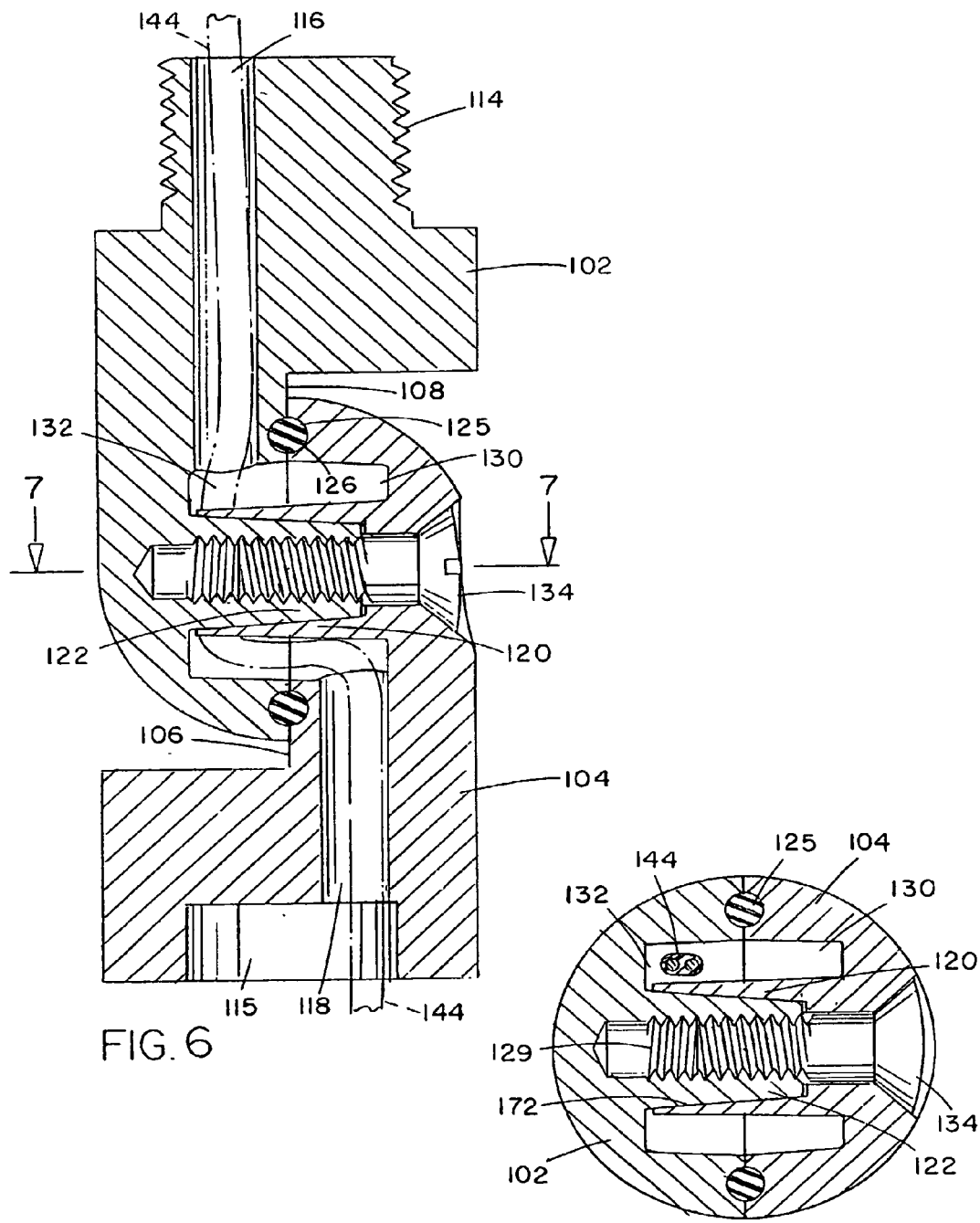
FIG. 6 is an enlarged sectional view taken on line 6—6 of FIG. 1.
FIG. 7 is a sectional view of the present invention taken on line 7—7 of FIG. 6.

Referring to FIG. 1, the knuckle joint assembly is formed by the combination of base knuckle 102, top knuckle 104, and locking screw 134. Base knuckle 102 has a proximal end 150 corresponding to the pivot point and a distal end 152 which provides means for attaching to a support or other like structure such as a spike which may be driven into the ground, a pole or wall mount (not shown). A conduit for passing electrical wiring from a voltage supply to a lamp extends through the joint assembly, beginning at bore 116 at distal end 152 and exiting through the distal end 156 of top knuckle 102. In the preferred embodiment, base knuckle 102 and top knuckle 104 are formed from brass by CNC machining of a cylindrical bar, or by other machining or forming techniques known in the art. Other corrosion resistant materials may be used as well, including stainless steel, aluminum, copper, ceramic, or high temperature plastics or composites, by machining, die casting or molding where appropriate. A rock tumbler or finishing vibrator can be used to remove any marks left after machining. Exterior finishes may be used to enhance the aesthetics and/or durability of the joint, including painting, powder coating, electroplating and anodizing. In instances where the components are to be coated, allowances must be made in the machine manufacture of the joint assembly to compensate for any thickness the coating adds to the measurable dimensions of the joint. Locking screw 134 is disposed within screw seat 136 of base knuckle 102 to secure base knuckle 102 and top knuckle 104 together.

The components of the knuckle joint assembly are more clearly illustrated in FIGS. 2 and 3, which show perspective views of the uncoupled top knuckle 104 and base knuckle 102, respectively. As shown in FIG. 2, base knuckle 102 comprises a generally cylindrical body having a proximal end 150 with a domed shaped and a distal end 152, where the cylindrical body is effectively cut in half lengthwise to define flattened face 108 in a recessed area on its inner side. Flattened face 108 is distally terminated by pivot stop 112, a peaked structure with its apex aligned with a longitudinal plane bisecting flattened face 108. Where the knuckles are formed by machining, pivot stop 112 is the portion of the cylindrical body that remains after material is removed to define face 108. It should be noted that the shape of the knuckle is not limited to a cylindrical body, but may also be rectangular or some other body that has polygonal cross-section, as long as a portion of the body is cut-away to define flattened face 108. The angled faces 158 and 160 of pivot stop 112 determine the range of movement of the joint. In the preferred embodiment, the angled faces 158 and 160 are selected to be on the order of 30°, providing a total range of rotation of about 240°. Axially extending from distal end 152 is externally threaded portion 114 for threadably securing the knuckle joint assembly to an appropriate support which is partially represented by dashed lines in FIG. 5. As will be readily apparent to those of skill in the art, other fastening means may be utilized, and the described externally threaded connection of the preferred embodiment is not intended to be limiting. Bore 116 traverses threaded portion 114 through the body of base knuckle 102, exiting through vertical face 108 to provide a conduit for electrical wiring running from a voltage source to a lamp mounted on the knuckle joint assembly.

A circular cavity 132 is formed in vertical face 108 of base knuckle 102. Extending concentrically from cavity 132 is a tapered male ferrule 122 which has a decreasing diameter as it extends from cavity 132. Ferrule 132 is internally threaded with threads 129 for mating with locking screw 134 which holds the two knuckles together once the angle has been adjusted. An O-ring seat 126 encircles the perimeter of cavity 132 and defines half of a channel that, when the joint is assembled, provides a means for retaining an O-ring 125 (FIG. 3). O-ring 125 helps to seal the joint against moisture intrusion, but more importantly, provides a surface within the joint that creates some frictional resistance against rotation of top knuckle 104 relative to base knuckle 102 to prevent uncontrolled slippage while still permitting the joint to be adjusted.

Illustrated in FIG. 3, top knuckle 104 has a proximal end 154 corresponding to the pivoting end of the knuckle and a distal end 156 corresponding to the attachment point for a lamp, hood and lens (not shown). Top knuckle 104 is formed in a similar manner to base knuckle 102, in the preferred embodiment, with flattened face 106 formed by cutting a domed cylindrical body in half up to a point where face 106 is distally terminated by pivot stop 110. As noted above, the body shape is not limited to a cylinder, and those of skill in the art will recognize that the shape may be chosen for aesthetic purposes as long as a recessed flattened face 106 can be formed on its inner side to cooperate with face 108 of base knuckle 102. Pivot stop 11 has angled faces 162, 164 intersecting at an apex which limit the rotation of base knuckle 102 to a total range of about 240 when faces 162 and 164 have an angle on the order of 30 relative to a line perpendicular to a longitudinal centerline bisecting flattened face 106. Referring briefly to FIG. 4, a recess 115 is formed in distal end 156 of top knuckle 104 for receiving a lamp base or socket (not shown) which can be attached using threaded bores 138 and 140. The dimensions of recess 115 can be adapted to different applications by modifying the length and width of top knuckle 104, including making recess 115 large enough to retain a lamp and socket within the recess, thus making the joint itself the light fixture, with a lens or other light transmissive cover disposed over the opening to enclose the lamp within the recess. Bore 118 extends from recess 115 through the body of top knuckle 104, exiting through face 106 to provide a conduit for electrical wiring between the lamp and the voltage supply.

Circular cavity 130 is formed in vertical face 106 of top knuckle 104. Extending concentrically from cavity 130 is a tapered female ferrule 120 which has a decreasing outer diameter/increasing inner diameter as it extends from cavity 130. The inner diameter of ferrule 120 is slightly larger than the outer diameter of ferrule 122 of base knuckle 102 so that ferrule 122 will closely fit within ferrule 120 when the knuckles are joined to create a taper lock that will provide frictional resistance to rotation of the join. It should be noted that relative positions of the male and female ferrules can be reversed, i.e., that the female ferrule can be in base knuckle 102 and the male ferrule can be in top knuckle 104. When one ferrule is fully seated within the other ferrule, the friction between the two opposing ferrule surfaces creates a taper lock 172 (shown in FIG. 7) which, alone, should be sufficient to resist any change in the angle of the joint. Nonetheless, locking screw 134 is provided to keep the two knuckles together with the two ferrules in frictional contact, thus ensuring that taper lock 172 is not inadvertently disrupted by pulling one knuckle away from the other, thus separating the ferrules enough to allow essentially free rotation of the joint. Locking screw passage 128 runs through ferrule 120 and exits the side of top knuckle 104 are countersunk screw seat 136, which is shown in FIG. 1 with locking screw 134 in place. As with base knuckle 102, an O-ring seat encircles the perimeter of cavity 130, defining the other half of the channel that, when the joint is assembled, provides a means for retaining an O-ring 125, which is shown in place in the O-ring seat in FIG. 3. O-ring 125 can be formed from rubber, plastic, silicone, polymer or other resilient material.

Locking screw 134 traverses locking screw passage 128 extending through ferrule 120 of top knuckle 104 where it can be mated with screw threads 129 in ferrule 122 of base knuckle 102. It is the combined function of the taper lock 172, locking screw 134 and O-ring 125 that provide means for adjustable securing the pivoting knuckle assembly once the desired angle has been selected by the user. When locking screw 134 is tightened within screw threads 129, tension is increased within the taper lock 172 formed by ferrules 120 and 122 to prevent the knuckle assembly from being rotated. Tightening of screw 134 also increases the compression of O-ring 125, creating further resistance to rotation of the knuckle assembly. O-ring 125 also functions to prevent the intrusion of moisture and dirt within the internal cavities of the joint. Rotating locking screw 134 in a counter clock-wise direction decreases the tension on taper lock 172 thereby allowing the pivotal rotation of the knuckle joint.

As illustrated in FIG. 5, a lighting fixture, exemplified by lamp base plate 170, can be secured to the knuckle joint assembly by mounting screws which mate with threaded mounting bores 138, 140 of base knuckle 102. The lighting fixture/knuckle joint assembly can be attached to a support ground spike or like structure by mating threaded portion 114 of base knuckle 102 to a complimentary internally threaded portion of a support such as a ground spike that can be pushed into the ground, a pole or other appropriate mounting.

As illustrated in FIGS. 6 and 7, the union of base knuckle 102 and top knuckle 104 forms the pivotally adjustable knuckle joint of the present invention. The taper lock 172 formed by the cooperation between ferrules 120 and 122 provides means for axially rotating the knuckle joint assembly as well as providing means for maintaining the selected orientation of the joint assembly when combined with locking screw 134. O-ring seats 124, 126 are machined to form an annular seat for retaining the resilient O-ring 125 when the top and base knuckles are joined. Additionally, O-ring 125 creates additional resistance between the relative rotation of base knuckle 102 and top knuckle 104.

The joining of base knuckle 102 and top knuckle 104 to form the pivotally adjustable knuckle joint also creates a conduit from the distal end 152 of base knuckle 102 to the distal end 156 of top knuckle 104 through which an electrical wire 144 can pass from a voltage source outside of the fixture to the lamp inside the fixture. Bore 116 extends from the distal end 152 of base knuckle 102 and exits in cavity 132, where wire 144 follows the internal curvature of the combined cavities 130 and 132. Bore 118 extends from cavity 130 through top knuckle 104, exiting through distal end 156 to be connected to a lamp base (not shown). The smooth, unobstructed passageway comprising formed by combined cavity 130, 132 permits wire 144 to traverse the interior of the unit knuckle joint without binding or chafing while still allowing the knuckle joint to be pivotally adjustable. In one exemplary embodiment, for installation using a ground spike, wire 144 would continue from distal end 156 through an opening in the ground spike, then continues to termination at the transformer or other power supply. In an alternate embodiment, threaded portion 114 of top knuckle 104 is attached to a tubular post (not shown) or other form of support which is then, in turn, connected to the ground spike. Wire 144 would pass from the knuckle joint assembly, through the entire length of the tubular post, through the opening in the ground spike and then continue to termination at the power source.

The pivotally adjustable knuckle joint assembly of the present invention provides a robust mounting with a wide range of directional control for a lighting fixture. The pivotal joint construction provides simple one screw adjustment for the variable directability of the affixed lighting component with the entire joint designed to resist the effects of prolonged environmental exposure. The configuration of the present invention is aesthetically pleasing with clean lines and is constructed with a focus on simplicity and durability.

Other embodiments of the present invention may occur to those of ordinary skill in the art in view of these teachings. Therefore, this invention is to be limited only by the following claims which include all other such embodiments and modifications when viewed in conjunction with the above specification and accompanying drawings.

I claim:

1. A joint for an outdoor lighting fixture, comprising:
   a base knuckle and a top knuckle, each knuckle comprising:
   (i) a body having a longitudinally-extending recessed flattened face formed on an inner side, wherein the flattened face defines a plane that is bisected by a longitudinal centerline;
   (ii) a single peaked structure comprising two intersecting angled faces extending perpendicular to the plane and across a full width of the body, the single peaked structure having an apex centered along the longitudinal centerline;
   (iii) a cavity formed in the flattened face so that it is bisected by the longitudinal centerline;
   (iv) a tapered ferrule extending from the cavity so that it is bisected by the longitudinal centerline; and
   (v) a bore extending from a distal end of each knuckle into the cavity for receiving an electrical wire;
   wherein, when the flattened face of the base knuckle is disposed opposing the flattened face of the top knuckle with the ferrules aligned, the ferrule of one of the base knuckle and the top knuckle fits within the ferrule of the other of the base knuckle and the top knuckle to create a pivot point and the cavities of the base knuckle and the top knuckle are enclosed; and
   a screw passing through and threadably retained within the pivot point for locking the base knuckle and top knuckle at a predetermined angle;
   wherein, when the top knuckle is pivoted with respect to the base knuckle, a pivot stop is formed when one of the two angled faces on the base knuckle and one of the two angled faces on the top knuckle abut each other, and wherein, when the joint is assembled, exposed surfaces of the top knuckle and the base knuckle are free of recesses that can retain contaminants.

2. The joint as in claim 1, wherein an O-ring seat is formed in the flattened face of each of the base knuckle and the top knuckle around the corresponding cavity and further comprising an O-ring disposed within the O-ring seat between the base knuckle and the top knuckle.

3. The joint as in claim 1, wherein the body of each of the base knuckle and the top knuckle is a cylinder and the flattened face of each of the base knuckle and the top knuckle is formed by cutting away a portion of the cylinder.

4. The joint as in claim 1, wherein each of the base knuckle and the top knuckle is formed from brass.

5. The joint as in claim 1, wherein the base knuckle has a distal end adapted for attachment to a mounting structure.

6. The joint as in claim 1, wherein the top knuckle has a distal end adapted for attachment to a lamp.

7. The joint as in claim 6, wherein each angled face is disposed at an angle of 30°.

8. An adjustable joint for supporting an outdoor lighting fixture, comprising:
 a base knuckle comprising a first body having a first flattened face formed on an inner side of the base knuckle, a first cavity formed in the first flattened face, and a first tapered ferrule extending from the first cavity, a first pivot stop disposed at a distal end of the first flattened face, the first pivot stop comprising a first pair of angled faces intersecting to form a first single peaked structure having a first apex centered on a first longitudinal centerline bisecting the first flattened face, wherein the first pair of angled faces extends across a full width of the first body, and a first bore extending from a distal end of the base knuckle into the first cavity for receiving an electrical wire;
 a top knuckle comprising a second body having a second flattened face formed on an inner side of the top knuckle, a second cavity formed in the second flattened face, and a second tapered ferrule extending from the second cavity, the second tapered ferrule having a different diameter than the first tapered ferrule, so that one of the first and second tapered ferrules will fit within the other tapered ferrule to define a pivot point, a second pivot stop comprising a second pair of angled faces intersecting to form a second peaked structure having a second apex centered on a second longitudinal centerline bisecting the second flattened face, wherein the second pair of angled faces extends across a full width of the second body, and a second bore extending from a distal end of the top knuckle into the second cavity for receiving the electrical wire; and
 a screw passing through and threadably retained within one of the first tapered ferrule and the second tapered ferrule for locking the base knuckle and the top knuckle at a predetermined angle;
 wherein the first and second pivot stops cooperate to prevent further pivoting around the pivot point when the top knuckle is pivoted with respect to the base knuckle so that one of the first pair of angled faces and one of the second pair of angled faces abut each other, wherein the first and second single peaked structures and, when the joint is assembled, exposed surfaces of the top knuckle and the base knuckle are free of recesses that can retain contaminants.

9. The adjustable joint as in claim 8, wherein an O-ring seat is formed in each of the first and second flattened faces around the first and second cavity, respectively, and further comprising an O-ring disposed within the O-ring seat between the base knuckle and the top knuckle.

10. The adjustable joint as in claim 8, wherein each of the first and second bodies is a cylinder and the first and second flattened faces are formed by cutting away a portion of the cylinder.

11. The adjustable joint as in claim 8, wherein each of the first body and the second body is formed from brass.

12. The adjustable joint as in claim 8, wherein the distal end of the base knuckle is adapted for attachment to a mounting structure.

13. The adjustable joint as in claim 8, wherein the distal end of the top knuckle is adapted for attachment to a lamp.

14. The adjustable joint of claim 8, wherein each angled face of the first and second pairs of angled faces is disposed at an angle of 30°.

15. An adjustable joint for an outdoor light fixture comprising:
 a base knuckle and a top knuckle, each knuckle comprising:
  (i) a body having a longitudinally-extending flattened face formed on an inner side, wherein the flattened face defines a plane that is bisected by a longitudinal centerline;
  (ii) a tapered ferrule extending from the flattened face of each knuckle for forming a taper lock;
  (iii) a single peaked structure comprising two intersecting angled faces extending perpendicular to the plane and across a full width of the body, the single peaked structure having an apex centered along the longitudinal centerline; and
  (iv) a bore formed longitudinally through each knuckle for passing an electrical wire from a distal end of the base knuckle to a distal end of the top knuckle; and
 a fastener for holding the base knuckle and the top knuckle together;
 wherein a pivot stop is formed when one of the pair of angled faces on the base knuckle and one of the pair of angled faces on the top knuckle abut each other, and wherein, when the joint is assembled, exposed surfaces of the top knuckle and the base knuckle are free of recesses that can retain contaminants.

16. The adjustable joint as in claim 15, wherein the O-ring seat is formed in the flattened face of each of the base knuckle and the top knuckle around the corresponding tapered ferrule and further comprising an O-ring disposed within the O-ring seat between the base knuckle and the top knuckle.

17. The adjustable joint as in claim 15, wherein the body of each knuckle is a cylinder and the flattened face is formed by cutting away a portion of the cylinder.

18. The adjustable joint as in claim 15, wherein the distal end of the base knuckle is adapted for attachment to a mounting structure.

19. The adjustable joint as in claim 15, wherein the distal end of the top knuckle is adapted for attachment to a lamp.

20. A joint for an outdoor lighting fixture, comprising:
 a first knuckle having a first distal end and a first proximal end, the first proximal end having a first cut-away portion defining a first flattened face terminating at a pair of first intersecting angled faces extending across a full width of the first knuckle and forming a first single peaked structure having a first apex centered along a longitudinal centerline bisecting the first flattened face, a first cavity formed in the first flattened face, a first tapered ferrule extending from the first cavity, and a first bore extending from the first distal end into the first cavity for receiving a first portion of an electrical wire for connection to a voltage supply;

a second knuckle having a second distal end and a second proximal end, the second proximal end having a second cut-away portion defining a second flattened face terminating at a pair of second intersecting angled faces extending across a full width of the second knuckle and forming a second single peaked structure having a second apex centered along a longitudinal centerline bisecting the second flattened face, a second cavity formed in the second flattened face, a second tapered ferrule extending from the second cavity, and a second bore extending from the second distal end into the second cavity for receiving a second portion of the electrical wire for connection to a lamp, wherein one of the first and second ferrules fits within the other of the first and second ferrules when the first flattened face is disposed adjacent the second flattened face; and a fastener passing through the first and second ferrules for holding the first and second knuckles together;

wherein the first single peaked structure and the second single peaked structure cooperate to limit relative rotation of the first and second knuckles to a predetermined rotational range by forming a pivot stop when one of the pair of angled faces on the base knuckle and one of the pair of angled faces on the top knuckle abut each other, and wherein the flattened faces and the single peaked structures are free of exposed recesses in which contaminants can be trapped when the joint is assembled.

21. The joint as in claim 20, wherein the predetermined rotational range is about 240°.

22. The joint as in claim 20, wherein each of the first knuckle and the second knuckle comprises a cylindrical body.

* * * * *